United States Patent [19]

Wyse

[11] 4,062,600
[45] Dec. 13, 1977

[54] DUAL-GIMBAL GYROSCOPE FLEXURE SUSPENSION

[75] Inventor: Stanley Frederick Wyse, Encino, Canada

[73] Assignee: Litton Systems, Inc., Woodland Hills, Calif.

[21] Appl. No.: 673,745

[22] Filed: Apr. 5, 1976

[51] Int. Cl.$^2$ .............................................. G01C 19/18
[52] U.S. Cl. ...................................... 308/2 A; 74/5 F
[58] Field of Search ................. 308/2 R, 2 A; 74/5 F, 74/5 R

[56] References Cited

U.S. PATENT DOCUMENTS 3,856,366  12/1974  Weisbord et al. .................... 308/2 A Primary Examiner—Joseph F. Peters, Jr.
Assistant Examiner—Gene A. Church
Attorney, Agent, or Firm—Harold E. Gillmann

[57] ABSTRACT

A universal gyroscope flexure hinge assembly is provided to interconnect the inertial flywheel of a 2-axes free rotor gyroscope to the gyroscope spin shaft, with two symmetrical, axially displaced gimbal elements which allow two axes of angular freedom. Errors which would arise due to axially displaced gimbal elements are compensated for by offsetting the flexure axes of the two gimbal elements. Each pair of flexure blades forming a flexure hinge have a common flexure axis and the flexure hinge assembly has only two orthogonal flexure axes which are axially displaced from one another.

8 Claims, 6 Drawing Figures

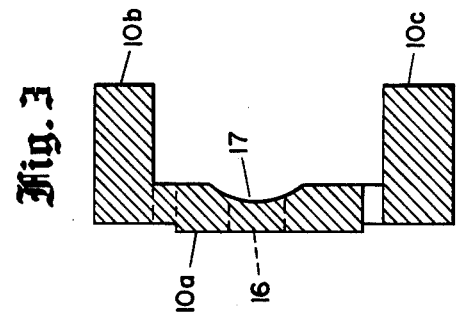
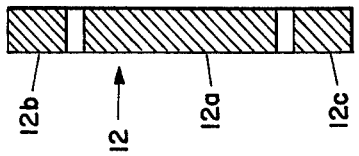
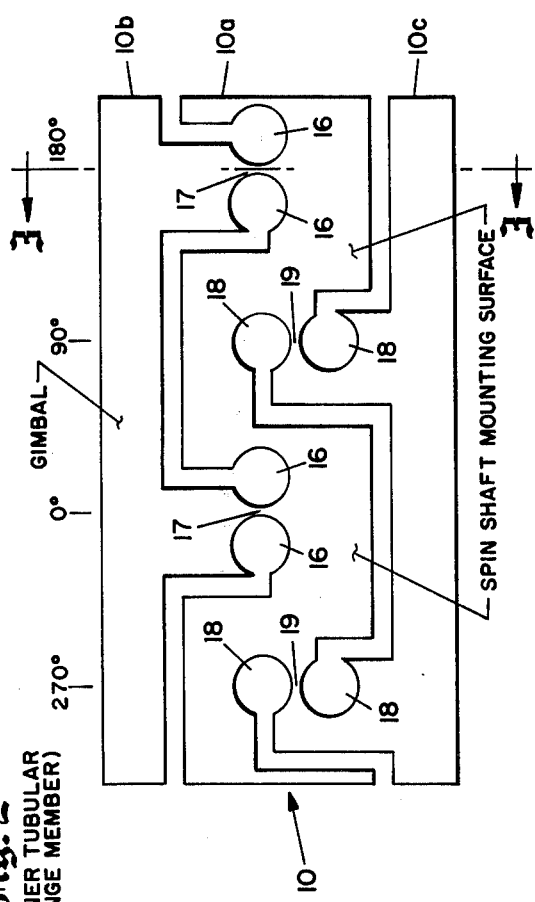
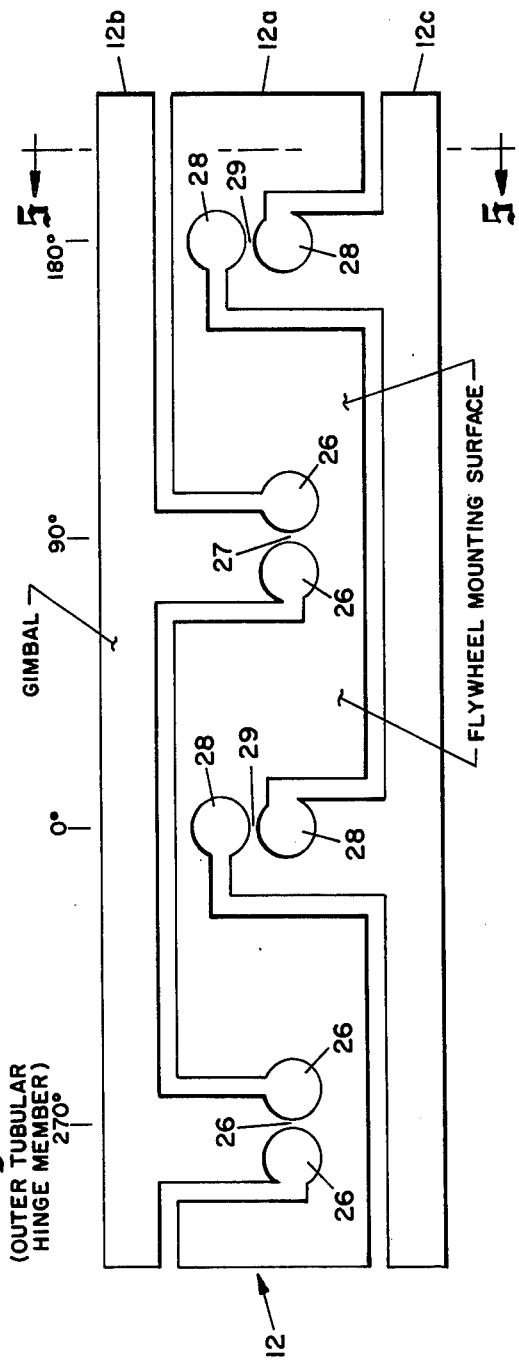

DUAL-GIMBAL GYROSCOPE FLEXURE SUSPENSION

BACKGROUND OF THE INVENTION

The present invention is concerned with a gyroscope universal flexure hinge assembly of the type described, for example, in U.S. Pat. No. 3,856,366. The patent describes a flexure hinge suspension assembly for use in a free-rotor displacement-type gyroscope, and which comprises an inner tubular hinge member and an outer tubular hinge member concentrically nested within one another and generally coaxial with the spin axis of the gyroscope.

In the assembly to be described herein, and in the assembly described in the patent, the flexure blades are formed in each of the tubular hinge members by corresponding pairs of closely spaced apertures which extend through the wall of each hinge member. Then, when the two tubular hinge members are nested within one another and rigidly fastened to one another, an appropriate orthogonal alignment between the flexure blades of the inner and outer members is established so that two tubular hinge members may operate in their intended manner, i.e., to support the flywheel against torsional and radial displacements relative to the spin axis and against axial displacements along the spin axis.

The prior art flexure hinge assembly of the type described in the patent has a major disadvantage. If the suspension assembly is constructed according to the patent, the flywheel would have very high torsional stiffness about axes perpendicular to the spin axis. The spin axis of the rotor would essentially be locked in alignment with the shaft axis of spin. In order for the rotor to have two degrees of angular freedom relative to the shaft the centers of rotation of the hinges along each suspension axis must be coincident (colinear or aligned). The prior art hinge assembly described in the referenced patent above shows that the centers of the hinge pairs which form each axis are purposely not aligned. This misalignment causes very high torsional stiffness for the flywheel angular displacements about axes perpendicular to the spin axis, a condition which is quite contrary to the intended operation of the gyroscope suspension.

SUMMARY OF THE INVENTION

A universal joint gyroscope flexure hinge assembly is provided to interconnect the inertial flywheel of a 2-axes free-rotor gyroscope to a spin shaft, and which allows two axes of angular freedom. The flexure hinge assembly comprises a symmetrical double universal joint which is constructed to eliminate sources of gyroscope errors. The assembly includes an inner tubular hinge member which is concentrically mounted within an outer tubular hinge member. Each of the two tubular hinge members contains four flexure blades. The flexure blades in each hinge member are alternatively positioned for radial and axial flexure although other arrangements of flexure blades may be utilized with the invention. The inner tubular hinge member is configured into a first section which receives the spin shaft and into two additional sections which form first and second gimbal elements. The outer tubular hinge member is configured into a first section which receives the gyroscope inertial flywheel, and into two additional sections which are respectively concentric with the corresponding sections of the inner tubular hinge member and, which cooperate with the corresponding sections of the inner hinge member to form the first and second gimbal elements whuch are axially displaced in opposite directions from the overall center of gravity on the spin axis.

According to the invention the rotor attached flexure blades of one gimbal element and the shaft-attached flexure blades of the other gimbal element form a pair of diametrically opposed flexure hinges with a first common flexure axis. The remaining shaft-attached flexure blades and rotor-attached flexure blades have a second common flexure axis. The first and second flexure axes are axially displaced from one another to compensate for rectified errors caused by two gimbals having axially displaced centers of gravity. Thus each pair of flexure blades forming a flexure hinge bend about a common center of rotation and do not bend about very stiff portions of two flexure blades having displaced centers of rotation.

BRIEF DESCRIPTION OF THE DRAWINGS

FIG. 2 is a developed view of the inner tubular hinge member of the assembly of FIG. 1;

FIG. 3 is a sectional view taken essentially along the lines 3—3 of FIG. 2;

FIG. 4 is a developed view of the outer tubular hinge member of the assembly of FIG. 1;

FIG. 5 is a sectional view taken essentially along the line 5—5 of FIG. 4; and

DETAILED DESCRIPTION OF THE ILLUSTRATED EMBODIMENT

Figure 1:
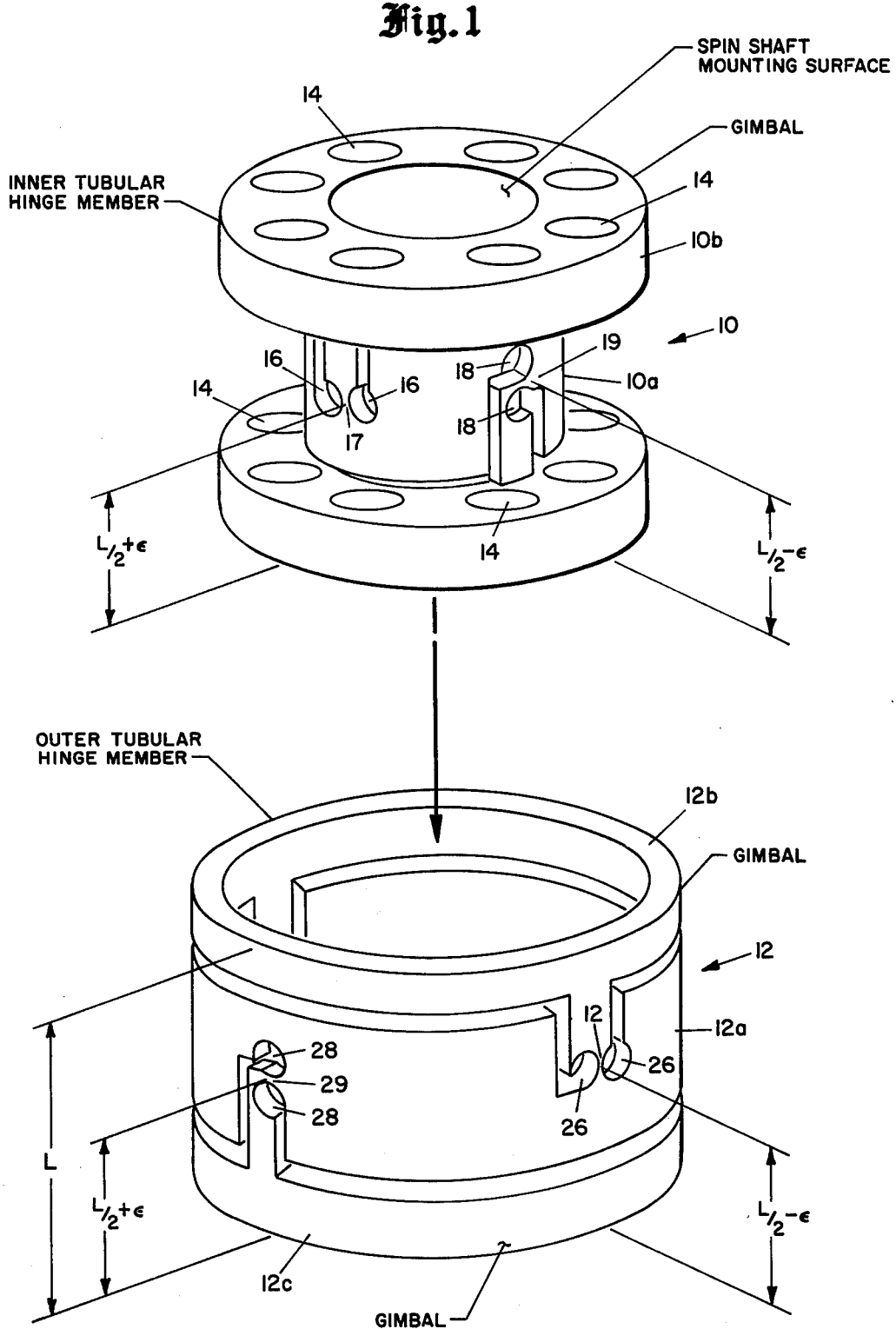
FIG. 1 is an exploded perspective view depicting the inner and outer tubular hinge members which together make up the gyroscope universal flexure suspension assembly of the invention.

As shown in FIG. 1, for example, the universal flexure suspension in the illustrated embodiment of the invention includes an inner tubular hinge member 10 and an outer tubular hinge member 12. The inner tubular hinge member 10 is nested within the outer tubular hinge member 12 to be coaxial, i.e. concentric therewith about the spin axis of the assembly. The inner tubular member 10 includes a central hub section 10a, and it includes two end sections 10b and 10c, each of which has an outer diameter greater than the outer diameter of the central hub section 10a. The outer tubular hinge member 12 includes a central section 12, and two end sections 12b and 12c.

When the inner tubular hinge member 10 is positioned coaxially within the outer tubular hinge member 12, the end sections 10b and 12b are concentric with one another, and secured together, by welding or the like, to form a first gimbal element of the assembly. Likewise, the end sections 10c and 12c are concentric with one another and secured together, by welding or the like, to form a second gimbal element of the assembly. The outer surface of the central section 12a of the tubular member 12 forms a mounting surface for the inertial fly wheel of the gyroscope, whereas the inner bore surface of the inner tubular member 10 forms a mounting surface for the gyroscope spin shaft.

The end sections 10b and 10c of the inner tubular member may have a plurality of tapped holes 14 therein for receiving threaded balancing weights for final trim and adjustment purposes.

As best seen in FIG. 2, pairs of closely adjacent apertures 16 and 18 are formed in the wall of the inner tubular member 10, and these apertures are positioned at 90° angular intervals around the periphery thereof. The apertures 16 form flexure blades 17 which extend essentially perpendicularly to the spin axis of the assembly, whereas the apertures 18 form flexure blades 19 which extend generally parallel to the spin axis. As shown in FIG. 2, the flexure blades 17 connect the section 10a to the section 10b, whereas the flexure blades 19 connect the section 10a to the section 10c.

As shown in FIG. 4, the outer tubular member 12 has first pairs of closely adjacent apertures 26 and second pairs of closely adjacent apertures 28 formed at 90° angular intervals about its periphery. The apertures 26 form flexure blades 27 which extend parallel to the spin axis, whereas the apertures 28 form flexure blades 29 which extend generally perpendicular to the spin axis.

The inner and outer tubular members 10 and 12 are provided with a series of slots, as shown, so that the gimbal element portions formed by the sections 10b, 12b and 10c, 12c, may provide angular freedom of a flywheel about the X- and Y-axes with respect to the spin axis. The section 10b is welded, or otherwise, affixed to the section 12b, and the section 10c is welded, or otherwise affixed to the section 12c. The orientation of the flexures, as described above is such that the shaft to gimbal flexures of the gimbals at each end of the assembly are at 90° to one another.

For example, the diametrically opposed flexure blades 17 and 29 of the gimbal elements 10b and 12b may be considered to lie along the one-axis, and the diametrically opposed flexure blades 19 and 27 of the gimbal elements 10c, 12c may be considered to lie along the other axis. In this way, two degrees of angular freedom are provided and the suspension assembly is composed of two separate universal joints, one providing horizontal (radial) support and the other providing vertical (axial) support.

The flexural restraint on the inertial flywheel can be cancelled at a particular speed by properly selecting the magnitude of the moments of inertia of the two gimbal element portions about the pivot point. Fine tuning of the assembly can be achieved by using selected weight screws in the tapped holes 14 provided in the inner tubular hinge member.

The two gimbal element portions are angularly displaced by 90° with respect to one another, so that the assembly cannot rectify angular vibrations in a horizontal plane when occurring at twice the flywheel frequency as taught in U.S. Pat. No. 3,678,764. The horizontal and vertical linear stiffness of the inner and outer tubular hinge members are both high, and they can be matched by properly selecting the widths of the vertical and horizontal flexure blades, this being achieved by selecting proper dimensions for the structure.

The two gimbal element portions formed by the assembly are symmetrical about the pivot point. If the center of gravity of each gimbal element lies at the pivot point, the suspension of the invention will not rectify linear vibrations in the horizontal plane which occur at twice the rotor, i.e. spin frequency.

However, it may be desirable for the center of gravity of each of the two gimbal element portions of the assembly to be displaced from the pivot point of the suspension. In such a case, a torque on the rotor occurs when the gyroscope is acted upon by a sinusoidal acceleration. This torque is sinusoidal at the excitation frequency and is proportional to the weight of a gimbal element portion, and to the distance of the gimbal center of gravity from the pivot point, as well as to the magnitude of the sinusoidal acceleration. If the vibration frequency equals twice the spin frequency, the sinusoidal torque is rectified, and a steady state error torque is experienced by the flywheel. Even though the two gimbal elements in the suspension assembly are symmetrically placed, so that they are at equal distances from the pivot point, the steady state torque described above does not normally cancel because the gimbals are phased 90° apart relative to the drive shaft. This 90° angular separation of the gimbals is necessary for other purposes, and cannot be changed.

The foregoing is compensated by offsetting the hinges between the two axes. For example, in the compensated assembly, the flexure blades 17 and 29 in FIG. 1 are located a distance $L/2 + \epsilon$ from the bottom surface of the hinge assembly, and flexure blades 19 and 27 in FIG. 1 are located at a distance $L/2 - \epsilon$ from the bottom surface of the hinge assembly. The distance $\epsilon$ is given by:

$$\epsilon = W_G/W_{FW} \cdot L_G = [W_G \cdot L_G/W_{FW}]$$

wherein $L_G$ = distance of each gimbal center of gravity from its shaft connecting flexure axis.

$W_G$ = weight of gimbal $W_{FW}$ = weight of flywheel

After the inner tubular hinge member 10 is positioned coaxially, i.e. concentrically within the outer tubular hinge member 12, then the pivot axes defined by blades 17 and 29 are colinear. Similarly, the pivot axes defined by blades 19 and 27 are colinear. Thus, all the pivot centers along the X-axis are aligned and all the pivot centers along the Y-axis are aligned, but the X and Y axes are skewed, and miss intersecting each other by a separation distance of $2\epsilon$.

In a complete gyroscopic instrument, a flywheel is mounted on the central section 12a so that its center of gravity lies in a plane parallel to the X and Y axes and located halfway between the axes, i.e., at $L/2$ from the bottom as well as from the top of the hinge assembly.

The invention provides, therefore, an improved and simplified flexure suspension assembly for a gyroscope, which is constructed to provide a completely symmetrical, dual-gimbal universal joint, which has the capability of providing equal, relatively high linear stiffness in the radial and axial directions, and in which all known sources of gyroscopic error are eliminated.

While a particular embodiment of the invention has been shown and described, modifications may be made. It is intended in the claims to cover all modifications which come within the spirit and scope of the invention.

DESCRIPTION OF A DEVICE EMBODYING THE INVENTION

Figure 6:
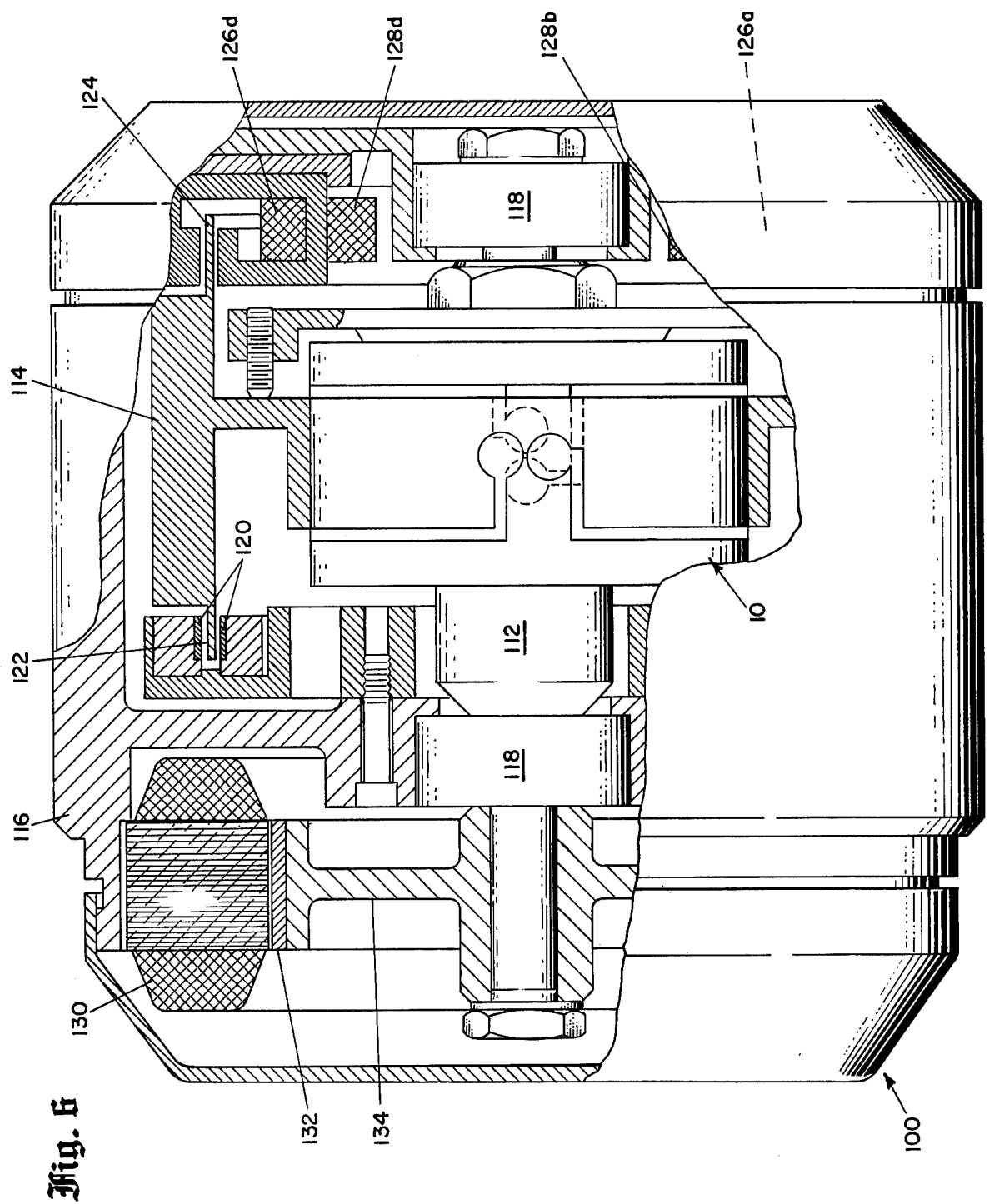
FIG. 6 is a cross sectional view of a gyroscope embodying the flexure hinge assembly of the invention.

Referring now to FIG. 6 there is shown a cross section of a free-rotor flexure-suspended gyroscope 100, similar to the one described in U.S. Pat. No. 3,678,764, except that flexure hinge assembly 10 has been substituted for the suspension means of this prior art gyroscope. The gyroscope shown in FIG. 6 includes, in addition to flexure hinge assembly 10, a drive shaft 112 and an inertial wheel 114. The flexure hinge assembly 114 interconnects drive shaft 112 and inertial wheel 114.

Inertial wheel 114 may be bonded to flexure hinge assembly 10.

The operating principle of the gyroscope is based on angular decoupling of its spinning rotor such as inertial wheel 114, from the drive shaft 112. To explain this concept, consider the connection between the wheel and shaft to be a frictionless universal joint. In such a universal joint, there would be minimal restraint to angular motion between the wheel and the shaft. In addition, such a universal joint provides high resistance to translational motion parallel and perpendicular to the spin axis.

When the moment of inertia of each of the gimbal elements is adjusted in accordance with a tuning equation, the spinning rotor is free to deflect through small angles without experiencing reaction torques. Thus, a substantially frictionless universal joint is achieved. This concept is explained in more detail in U.S. Pat. No. 3,678,764. The dry, i.e. fluidless, tuned rotor feature eliminates all of the disadvantages of pigtail power leads, mass instability, radiation sensitivity, fluid stratification, gimbal pivots, etc. which are common to fluid-filled gyroscopes.

In FIG. 6 it can be seen that the inertial wheel 114 is secured to end section 12a and, in turn, through flexure blades to the gimbal elements comprising sections 10b and 12b and 10c and 12c. These gimbal elements, which are bonded together, are secured to the driving section 10a by flexure hinges. The inertial wheel 114 and flexure hinge assembly 10 form the entire sensitive element. As shown in FIG. 6 the shaft 112 is supported by a housing or case 116 with a pair of preloaded ball bearings 118. Ball bearings in this instrument are not part of the sensitive element and therefore have no influence on mass imbalance of the inertial wheel 114.

Capacitance pickoffs comprising a plurality of plates 120, in cooperation with flange 122 of inertial wheel 114, form four capacitor pairs for sensing angular displacement of the gyroscope housing relative to the rotor element. The pickoff signals may then be nulled by torquers and servo loops (not shown), thereby providing two axes of inertial stabilization or angular rate measurements. The four capacitance pickoffs are equiangularly spaced around the flange 122 (only one pickoff being shown in FIG. 6).

A means for applying eddy current torque to the inertial wheel 114 is shown in FIG. 6. A second condutive flange 124 is positioned around and at the other side of inertial wheel 114. Flange 124 fits into the gaps of four circumferentially symmetrically disposed electromagnets 126a, 126b, 126c, and 126d (only magnet 126d is shown in FIG. 6). Each of the electromagnets has a current-carrying coil which is connected to permit controlling the current by, for example, control means such as computers or servo means (not shown). The coils of the electromagnets are 128a, 128b, 128c, and 128d (two of which are shown in FIG. 6). the electromagnets are supported on a bracket secured to housing 116. When it is desired to apply a torque to inertial wheel flange 124 about an axis (not shown) passing through magnets 126a and 126c, magnets 126a and 126c are energized. The eddy currents induced in flange 124 react with the magnetic field to produce this torque. When it is desired to apply a torque to flange 124 about an axis (not shown) passing through the center of magnets 126b and 126d, magnets 126b and 126d are energized.

Isolation from external magnetic fields is provided by the selection of suitable material for the housing 116 which may be made of a high-permeability steel.

The spin motor may be a three-phase hysteresis synchronous motor which thus drives the shaft 112, flexure hinge assembly 10, and inertial wheel 114 at a desired spin speed. The spin motor comprises stator windings 130, hysteresis ring 132 and web 134.

What is claimed is:

1. A flexure hinge assembly comprising:

a pair of concentric tubular members partially attached to one another, each of said tubular members having at least two pairs of adjacent apertures extending through the walls thereof and each of said pairs of apertures forming a flexure blade, each said flexure blade having a flexure axis, a cross axis and a longitudinal axis, said cross axis being perpendicular to the flexure axis and colineal with a line extending from one wall of the flexure blade to the other between points of minimum thickness, said longitudinal axis being perpendicular to said flexure axis and to said cross axis;

a plurality of flexure hinges each comprising a flexure blade in said inner tubular member and a flexure blade in said outer tubular member, the pair of flexure blades comprising each flexure hinge having mutually perpendicular longitudinal aaxes and a common flexure axis;

said inner tubular member and said outer tubular member each being slotted to form a central element portion connected to a first gimbal element portion by a first pair of diametrically opposed flexure blades having a first colineal flexure axis and connected to a second gimbal element portion by a second pair of diametrically opposed flexure blades having a common second flexure axis, said first and second gimbal element portions being displaced in opposite directions from said central element portion along its axis of rotation;

said first gimbal element portions and said second gimbal element portions being fixedly connected to each other, respectively, to form first and second gimbal elements connected to first and second central element portions by flexure blades, said flexure hinges flexing to permit small angular misalignment between the axes of rotation of said first and second central elements;

said inner and outer tubular members being oriented about the rotational axis of said assembly with colineal first flexure axes and with colineal second flexure axes, said first and second flexure axes being susbstantially mutually perpendicular;

said flexure blades being located in said inner and outer tubular members to displace said first and second flexure axes at a different distance from one end surface of said assembly along its rotational axis.

2. The device as claimed in claim 1 wherein the longitudinal axes of said flexure blades in said inner tubular member alternately extend substantially perpendicular and parallel to the axis of rotation of said flexure hinge assembly.

3. The flexure hinge assembly claimed in claim 2, in which the respective gimbal element portions at the ends of said outer tubular member are respectively attached to the first and second gimbal element portions at the ends of said inner tubular member.

4. The flexure hinge assembly claimed in claim 1, in which the first and second gimbal portions each have an outer diameter greater than the outer diameter of the remaining portion of said inner tubular member.

5. The flexure hinge assembly claimed in claim 4, in which said first and second gimbal portions have apertures therein for receiving compensating weight members.

6. The flexure hinge assembly claimed in claim 1 wherein said common first flexure axis of one diametrically opposed pair of flexure hinges is located a distance $L/2 + \epsilon$ from said end surface and where said common second flexure axis of the other diametrically opposed pair of flexure hinges is located a distance of $L/2 - \epsilon$ from said end surface, where $\epsilon = W_G/W_{FW} \cdot L_G$ and $W_G$ is the weight of a gimbal element, $W_{FW}$ is the weight of the flywheel and $L_G$ is the axial distance from the center of gravity of each gimbal element to its inner central element-connecting flexure axis and where $L =$ the axial length of the flexure hinge assembly.

7. The flexure hinge assembly claimed in claim 2 wherein the flexure axes of said parallel flexure blades of said inner tubular member and the flexure axes of the perpendicular flexure blades of the outer tubular member are located a distance $L/2 + \epsilon$ from said end surface and wherein the flexure axes of said perpendicular flexure blades of said inner tubular member and the flexure axes of said parallel flexure blades of said outer tubular member are located a distance of $L/2 - \epsilon$ from said end surface, where $\epsilon = W_G/W_{FW} \cdot L_G$ and $W_G$ is the weight of a gimbal element, $W_{FW}$ is the weight of the flywheel and $L_G$ is the axial distance from the center of gravity of each gimbal element to its shaft-connecting flexure axis and where $L =$ the axial length of the flexure hinge assembly.

8. A gyroscope comprising:
a frame;
a rotatable drive shaft mounted on said frame;
a motor for rotating said drive shaft mounted on said frame;
an inertial wheel;
a flexure hinge assembly for suspending said inertial wheel from said drive shaft; said flexure hinge assembly mounted on said drive shaft, said inertial wheel mounted on said flexure hinge assembly, said flexure hinge assembly comprising;
a pair of concentric tubular members partially attached to one another, each of said tubular members having at least two pairs of adjacent apertures extending through the walls thereof and each of said pairs of apertures forming a flexure blade, each said flexure blade having a flexure axis, a cross axis and a longitudinal axis, said cross axis being perpendicular to the flexure axis and colineal with a line extending from one wall of the flexure blade to the other between points of minimum thickness, said longitundinal axis being perpendicular to said flexure axis and to said cross axis;
a plurality of flexure hinges each comprising a flexure blade in said inner tubular member and a flexure blade in said outer tubular member, the pair of flexure blades comprising each flexure hinge having mutually perpendicular longitudinal axes and a common flexure axis;
said inner tubular member being slotted to form said driving element connected to a first gimbal element portion by a first pair of diametrically opposed flexure blades having a first colineal flexure axis and connected to a second gimbal element portion by a second pair of diametrically opposed flexure blades having a common second flexure axis, said first and second gimbal element portions being displaced in opposite directions from said central element portion along its axis of rotation;
said outer tubular member being slotted to form said driven element connected to a third gimbal element portion by a third pair of diametrically opposed flexure blades also having said first colineal flexure axis and connected to a fourth gimbal element portion by a fourth pair of diametrically opposed flexure blades also having said second colineal flexure axis, said third and fourth gimbal element portions being displaced in opposite directions from said driven element along its axis of rotation;
said first and second gimbal element portions and said third and forth gimbal element portions being fixedly connected to each other, respectively, to form first and second gimbal elements connected to driving element and to said driven element by flexure blades, said flexure hinges formed by said flexure blades flexing to permit small angular misalignment between the axes of rotation of said driving and driven elements;
said inner and outer tubular members being oriented about the longitudinal axis of said assembly with said first and second flexure axes being substantially perpendicular;
said flexure blades being located in said inner and outer tubular members to displace said first and second flexure axes by a different distance from one end surface of said assembly along its longitudinal axis.

* * * * *